(12) United States Patent
Lehmann et al.

(10) Patent No.: US 11,459,998 B2
(45) Date of Patent: Oct. 4, 2022

(54) AUTONOMOUS UNMANNED WAVE ENERGY CONVERTER FOR MULTIFUNCTION SENSOR PLATFORM

(71) Applicant: CALWAVE POWER TECHNOLOGIES INC., Berkeley, CA (US)

(72) Inventors: Marcus Lehmann, Berkeley, CA (US); Thomas Boerner, Berkeley, CA (US); Nigel Kojimoto, Berkeley, CA (US); Bryan Murray, Berkeley, CA (US); Daniel Petcovic, Berkeley, CA (US)

(73) Assignee: CALWAVE POWER TECHNOLOGIES, INC., Berkeley, CA (US)

( * ) Notice: Subject to any disclaimer, the term of this patent is extended or adjusted under 35 U.S.C. 154(b) by 0 days.

(21) Appl. No.: 17/258,155

(22) PCT Filed: Jul. 5, 2019

(86) PCT No.: PCT/US2019/040744
§ 371 (c)(1),
(2) Date: Jan. 5, 2021

(87) PCT Pub. No.: WO2020/010342
PCT Pub. Date: Jan. 9, 2020

(65) Prior Publication Data
US 2021/0277863 A1    Sep. 9, 2021

Related U.S. Application Data

(60) Provisional application No. 62/694,385, filed on Jul. 5, 2018.

(51) Int. Cl.
*F03B 13/20* (2006.01)
*B63H 19/02* (2006.01)
(Continued)

(52) U.S. Cl.
CPC .............. *F03B 13/20* (2013.01); *B63B 22/20* (2013.01); *B63H 19/02* (2013.01); *B63B 21/50* (2013.01);
(Continued)

(58) Field of Classification Search
CPC ......... F03B 13/20; B63B 22/20; B63B 21/50; B63B 2022/006; B63B 2035/4466;
(Continued)

(56) References Cited

U.S. PATENT DOCUMENTS

2013/0059488 A1* 3/2013 Hine ........................ B63H 1/32
440/10
2018/0100481 A1* 4/2018 Ohlsson .............. F03B 13/1885

FOREIGN PATENT DOCUMENTS

WO        2017189455 A1    11/2017

OTHER PUBLICATIONS

International Search Report dated Oct. 25, 2019.
(Continued)

*Primary Examiner* — Joseph Ortega
(74) *Attorney, Agent, or Firm* — Womble Bond Dickinson (US) LLP (57) ABSTRACT

A submergible wave energy converter and method for using the same are described. In one embodiment, the wave energy converter may be used for deep water operations. In one embodiment, the submergible wave energy converter is an autonomous unmanned vehicle that enables remote ocean power generation. In one embodiment, the wave energy converter apparatus comprises an absorber having a body with an upper surface and a bottom surface and at least one power take-off (PTO) unit coupled to the absorber and configured to displace movement of the absorber body relative to a reference, where the power take-off unit is operable to perform motion energy conversion based on
(Continued)

displacement of the absorber body relative to the reference in response to wave excitation, and where the power take-off unit is operable to return the absorber body from a displaced position to a predefined equilibrium position and to provide a force acting on the absorber body for energy extraction.

32 Claims, 4 Drawing Sheets

(51) Int. Cl.
    *B63B 22/20*     (2006.01)
    *B63B 21/50*     (2006.01)
    *B63B 22/00*     (2006.01)
    *B63B 35/44*     (2006.01)
    *B63G 8/00*     (2006.01)
    *B63J 3/00*     (2006.01)

(52) U.S. Cl.
    CPC . *B63B 2022/006* (2013.01); *B63B 2035/4466* (2013.01); *B63G 2008/008* (2013.01); *B63J 2003/005* (2013.01); *F05B 2270/18* (2013.01)

(58) Field of Classification Search
    CPC ............... B63H 19/02; B63G 2008/008; B63J 2003/005; F05B 2270/18
    See application file for complete search history.

(56) References Cited

OTHER PUBLICATIONS

International Preliminary Report and Written Opinion on the Patentability of Application No. PCT/US2019/040744, dated Jan. 14, 2021, 11 pages.

\* cited by examiner

AUTONOMOUS UNMANNED WAVE ENERGY CONVERTER FOR MULTIFUNCTION SENSOR PLATFORM

RELATED APPLICATIONS

The present application is the national phase of International Application No. PCT/US2019/040744 filed on Jul. 5, 2019, which claims priority to and the benefit of U.S. Patent Application No. 62/694,385, filed on Jul. 5, 2018, and the disclosures of which are hereby incorporated herein by reference in their entireties.

FIELD OF THE INVENTION

Embodiments of the present invention pertain generally to autonomous power generation systems, and more particularly but not by way of limitation, one or more embodiments of the invention enable remote ocean power generation, such as a wave energy conversion system.

BACKGROUND

Remote ocean power is becoming increasingly important for commercial, scientific, and defense objectives. At present, most Unmanned/Autonomous Underwater Vehicles (UUVs or AUVs) and remote ocean power stations are battery powered and have limited operational deployment periods. This is limited by the amount of power that can be stored on board the system or generated locally. Current systems operate with installed battery packs and/or supplement stored energy with locally generated power from wind and/or solar energy. The limited space for battery storage and relatively low power density of wind and solar power limit the operational duration of systems, requiring them to be recovered frequently for recharging.

The oceans of the world have long been recognized as a potential continuous and abundant source of natural mechanical energy in remote offshore locations. Energy from the ocean could help to harvest energy and generate electricity or chemicals for remote energy needs for various uses, including propulsion, sensors, actuators/manipulators and many others.

However, successful harvesting of energy from the ocean environment for conversion into electrical energy or other forms of energy have been generally limited to small power levels below single or two digit kilowatts. One significant reason is the low energy density of other forms of energy not directly coupled to wave motion such as wind or solar energy and thermal or salinity gradient. Wave power offers a significantly higher energy density of 20-100 kW per meter of wave crest. A device capable of harnessing wave energy for conversion into another useful energy form (electrical, mechanical, chemical, thermal) could provide significantly higher power levels than UUV/AUVs or other ocean going devices which operate on stored energy (batteries) and/or rely on other forms of energy capture (solar, wind, thermal, chemical).

Wave energy converters (WECs) historically lack the ability to navigate to a desired location. WECs moored in place have a firm mechanical reference (usually the sea floor, but possibly some other structure) that can possibly help with power capture, but also create large forces in the mooring and power take-off (PTO) systems during harsh sea states. Thus, these devices must have structural strength suited for the most severe sea states, and thus are not suited to operational modes which require low-profile or point-to-point motion.

Successful harvesting of mechanical energy from waves for conversion into electrical energy has also been problematic because the power quality that is produced by these devices is typically poor due to the irregular velocity of the power generating structures as a result of the irregular spectral nature of the incoming ocean waves. Consequently, the generator is not able to operate at a constant speed for optimum efficiency. Rather, the output power is continuously, fluctuating from zero to a peak and back in every wave where the device absorber linkage is directly connected to its generator.

Accordingly, there is a need for a reliable way to harness wave power to produce electrical energy in remote marine environments that is efficient, easy to maintain and low in cost, and can be delivered to a designated point in the ocean.

SUMMARY OF THE DISCLOSURE

A navigable wave energy converter (WEC) and method for using the same are described. In one embodiment, the wave energy converter may be used for deep water operations. In one embodiment, the wave energy converter apparatus comprises an absorber having a body with an upper surface and a bottom surface and at least one power take-off (PTO) unit coupled to the absorber and configured to displace movement of the absorber body relative to a reference, where the power take-off unit is operable to perform motion energy conversion based on displacement of the absorber body relative to the lower body in response to wave excitation, and where the power take-off unit is operable to return the absorber body from a displaced position to a predefined equilibrium position and to provide a force acting on the absorber body for energy extraction.

Further aspects of the technology described herein will be brought out in the following portions of the specification, wherein the detailed description is for the purpose of fully disclosing embodiments of the technology without placing limitations thereon.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A system and method for converting wave energy of ocean waves to a motive force derived from relative motion created by the system's interaction with ocean water are described. In one embodiment, the system comprises at least one submersible wave energy harvesting body, at least one power take-off unit, at least one restoring force mechanism, and a reaction mechanism providing force acting on the absorber body for energy extraction. In one embodiment, the body includes a system for managing structural loads to maintain energy extraction at a high, and potentially maximum, level while mitigating damaging loads.

Figure 1A:
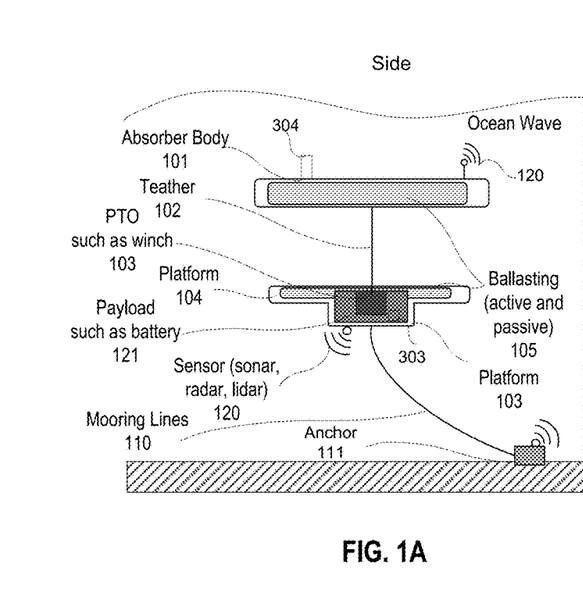
FIGS. 1A-C illustrate side, front and top views, respectively, of one embodiment of a wave energy converter apparatus for converting wave energy to usable power while anchored for a finite but indeterminate amount of time to a fixed position on the sea floor.
Figure 1B:
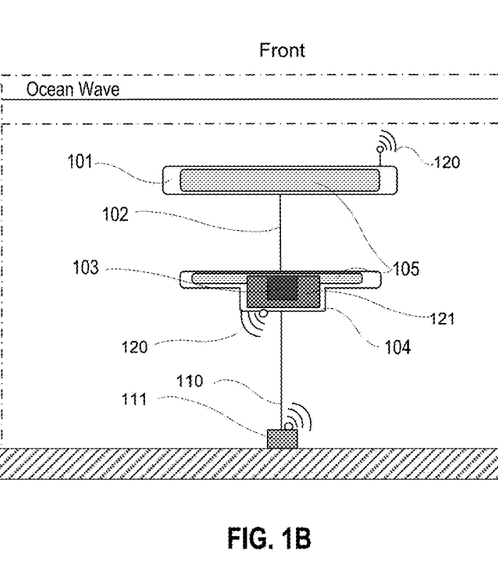
Figure 1C:
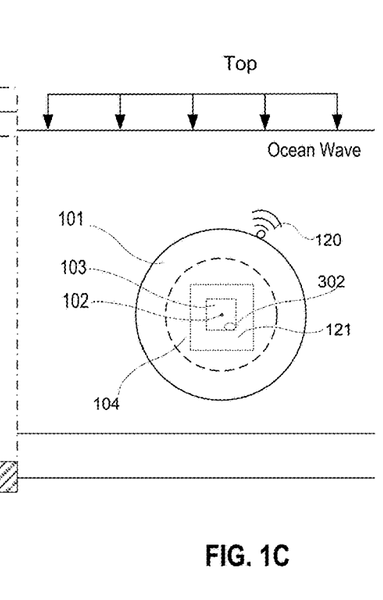

FIGS. 1A-C illustrate side, front and top views, respectively, of one embodiment of a wave energy converter apparatus for converting wave energy to usable power. In one embodiment, the apparatus converts wave energy to mechanically usable power such as, for example, a torque on a rotary shaft that can drive an electric generator, hydraulic pump or other consumers. The wave energy is captured by utilizing a submerged body, referred to as an absorber herein, that is excited by incident waves, creating a pressure differential between the top and bottom sides of the absorber. This pressure differential leads to alternating area loads across the area of the absorber and ultimately to oscillating relative motion of the absorber predominantly in heave, surge, and pitch degrees of freedom (DOF) but also the sway and roll DOF for off-neutral-axis incident waves.

Referring to FIGS. 1A-C, in one embodiment, the wave energy converter apparatus has two main structural elements: 1) an upper, horizontally oriented absorber 101, having a main function of a fluid-structure interaction for high performance wave to mechanical energy conversion; and, 2) a lower base 104, that is responsible for providing a reaction point for the damping and restoring force elements allowing for energy extraction of the absorber 101 from waves.

In one embodiment, the body of absorber 101 is rigid, slender, semi-rigid or flexible and the structure is able to extract energy from water waves by surge, heave, pitch, roll, yaw, and/or sway excitation. In one embodiment, absorber 101 is rectangular in shape. Note that other shapes and sizes of absorbers may be used. In one embodiment, absorber 101 comprises a composite of rigid beams and structures and semi-rigid materials and has a ballast system 105 to create a body with neutral, negative, or positive buoyancy.

The top surface of the body of absorber 101 can be planar, conical, cylindrical, or some other composite of these principle shapes. In one embodiment, the top surface of the body of absorber 101 has a hydrodynamically active surface area 301, as shown in FIG. 2C. In one embodiment, the hydrodynamically active surface area 301 may be changed by use of an active mechanism (not shown) which opens or closes one or more apertures 108 (e.g., FIG. 2C), which can neutralize the motive pressure differentials acting on the body.

In one embodiment, absorber 101 comprises of a plate that is constrained to split the water particles' orbital motions induced by ocean waves, thus creating independent locally-varying and time-varying pressures above and below the body of absorber 101, thereby inducing a motive force from the local and total pressure differential. The motion is then transferred through one or more tethers 102 connected to one or more power take-off units (PTOs) 103, which include, in one embodiment, a winch, which transforms the motion of absorber 101 into a standard form of mechanical power such as torque on a shaft. A restoring force is provided to ensure absorber 101 oscillates about a set equilibrium. A reaction mechanism is used to oppose the displacement of the power takeoff and thus transfer energy to a new mechanical form but is also capable of aiding the displacement of the PTO for increased net power extraction.

Absorber 101 is excited by the dynamic pressure difference created by overpassing waves, which produces a dynamic area load on absorber 101. The horizontally oriented absorber 101 horizontally splits the pressure gradient underneath incident waves, creating a pressure differential across it. This pressure differential leads to alternating area loads across the absorber area and ultimately to oscillating motion of absorber 101 relative to platform 104 predominantly in heave, surge, and pitch degrees of freedom (DOF) but also the sway and roll DOF for off-neutral-axis incident waves. One function of absorber 101 is to increase, and potentially maximize, the oscillating motion in heave, surge and pitch induced by the wave excitation load/water particle motion around the structure for on-neutral-axis waves and also in sway and roll for off-neutral-axis waves.

In one embodiment, absorber 101 and lower base platform 104 comprises a set of active or passive ballast tanks 105 that provide a static (neutral, positive or negative) or controllable buoyancy to control operating depth.

In one embodiment, the time-varying pressure differentials that create the motive force on the absorber body decrease in amplitude with increasing water depth. Thus, an absorber that is lower in the water column will experience lower overall absorber excitation and thus structural loads compared to the same absorber configuration higher in the water column. In one embodiment, the system maintains the ability to adjust its submergence.

In one embodiment, the body of absorber 101 and lower base platform structure 104 are mechanically connected through one or more tension-carrying tethers 102. In one embodiment, these tethers are fixed length. In an alternative embodiment, these tethers have an adjustable length. In one embodiment, the tethers have their length controlled by the action of PTO 103.

To enable efficient power extraction, one task of base platform 104 is to provide the reaction force to the increasing tension in the tethers or PTO tethers connecting platform 104 to absorber 101. This reaction force can come from a combination of inertia, hydrodynamic added mass, hydrodynamic added damping, or drag. Platform 104 is situated lower in the water column than absorber 101, and thus experiences lower wave-induced motion in absolute terms, as well as a phase difference relative to absorber 101. Precise force tracking on the PTO unit(s) is used to execute one of, or a combination of, energy harnessing control strategies such as classical spring-mass-damper, causal approximation, or impedance matching.

One or more mooring lines 110 are coupled to platform 103 and anchor 111.

Figure 2A:
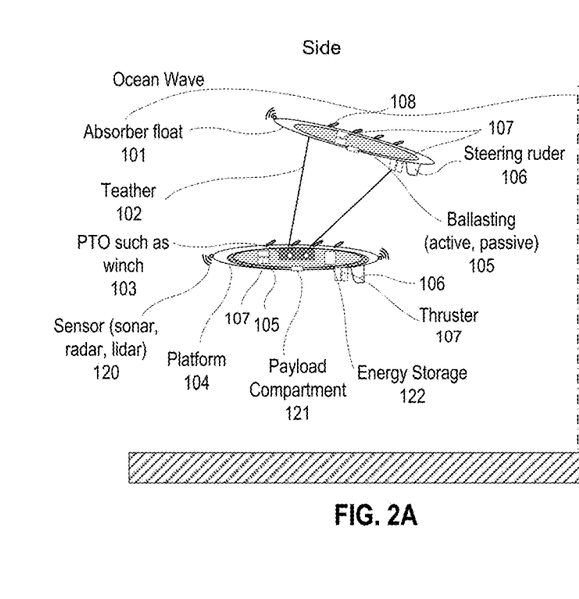
FIGS. 2A-C illustrate side, front and top views, respectively, of a self-propelling wave energy converter which uses a combination of wave motion and electro-mechanical propulsors to affect horizontal and vertical motion.
Figure 2B:
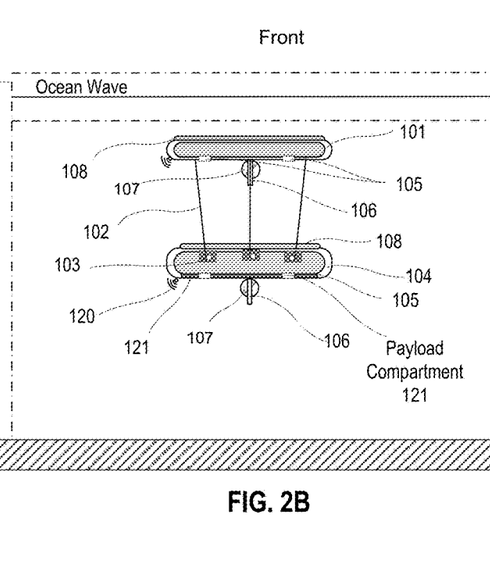
Figure 2C:
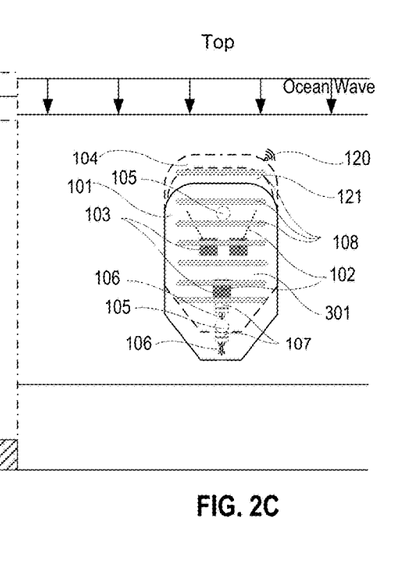

Referring to FIGS. 2A-2C, in one embodiment, the wave energy converter operates in a self-propelling mode. In one embodiment, PTO unit(s) 103 controls in a manner to affect the desired horizontal or vertical motion of the device simultaneously with energy capture.

In one embodiment, absorber 101 and platform 104 include steering rudders 106 for steering the respective body in its yaw degree of freedom.

In one embodiment, absorber 101 and platform 104 include thruster 107 to provide propsultion to the respective body in a surge, heave and pitch DOF independently.

In one embodiment, absorber 101 and platform 104 include propulsor panels 107 providing forward thrust on the respective body. Absorber 101 and platform 104 are lifted and pressed down in their heave DOF caused by wave forces. Propulsor panels 107 allow that lift motion to be converted into thrust by directing the water flow through the panels backwards creating a forward impulse on the body.

In one embodiment, energy is stored in an intermediate stage in capacitors or batteries depicted as an energy storage 303 in payload compartment 121 in FIG. 1A. In one embodiment, one function of these electrical energy storage devices is to smooth power flow from the PTO 103 to the on-board power consumers. In another embodiment, another function of these electrical energy storage devices is to store energy to be returned to PTO 103 to control the force acting on absorber 101 according to a control signal provided by a controller. In yet another embodiment, another function of these electrical energy storage devices is to provide continuous power to on-board power consumers in times when the energy generated from ocean waves is below the total on-board power requirement.

In one embodiment, platform 104 includes an adaptable payload compartment 121. The compartment can accommodate a range of independent sensors, actuators, or other third-party systems to allow the wave energy converter apparatus to serve a variety of mission profiles. In one embodiment, payload compartment 121 houses an AUV connector that is connected with the device power supply and information cable network, and an AUV can dock to that connector to transfer data in both directions and charge onboard batteries. In one embodiment, payload compartment 121 houses a manipulator that can be used to grab objects such as an AUV or environmental sample. In one embodiment, payload compartment 121 houses a payload such as a sensor pack or other object that can be released to the outside.

In one embodiment, absorber 101 and platform 104 include sensors 120, such as one or more of sensors related to sonar, radar, and lidar, that are connected to the device's sensory system. In one embodiment, tether 102 includes an electrical cable providing power and data transfer from platform 104 to sensors 120 of absorber 101.

Figure 3A:
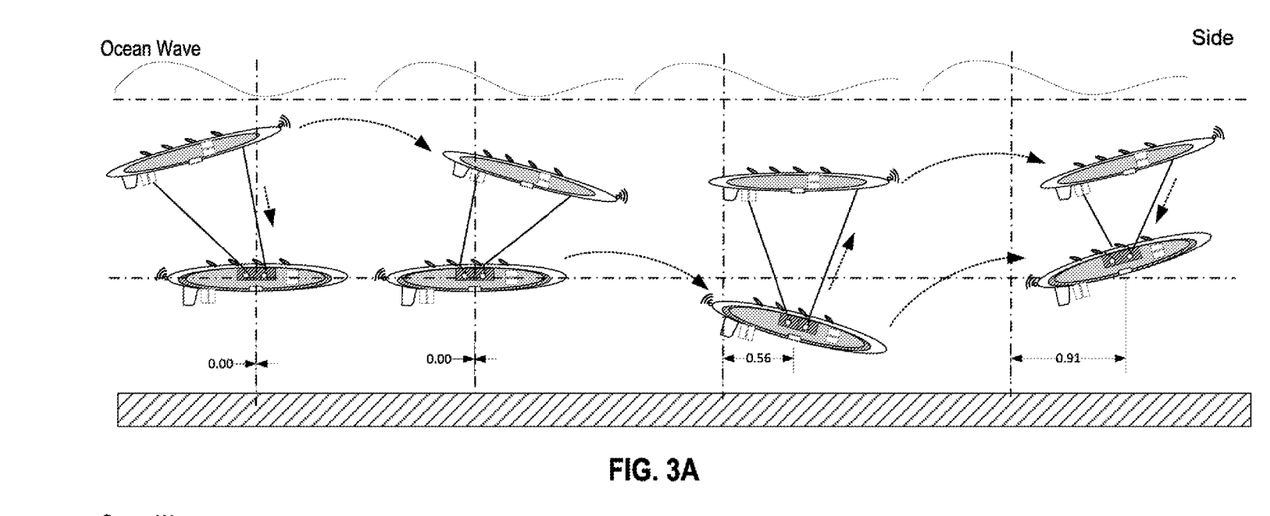
FIG. 3A illustrates a side view of the apparatus' motion in self propelling modus with a surface expression.
Figure 3B:
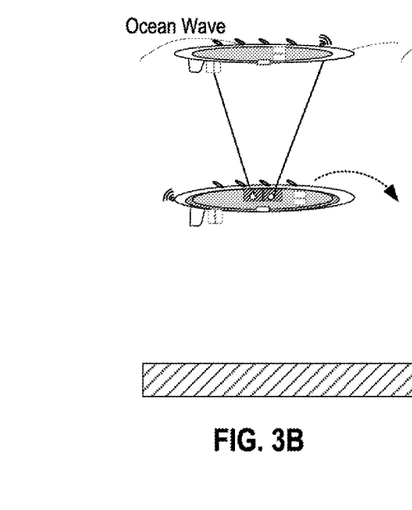
FIG. 3B illustrates a side view of the apparatus in self propelling modus operating below the sea surface.
Figure 3C:
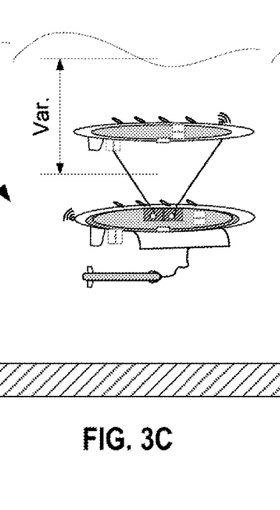
FIG. 3C illustrates a side view of the apparatus charging an AUV or interfacing with an independently deployed system.
Figure 3D:
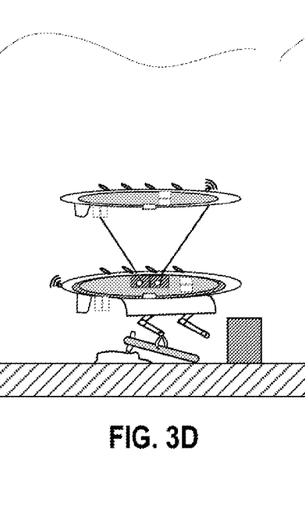
FIG. 3D illustrates a side view of the apparatus using a manipulator to collect and/or inspect an apparatus (e.g., Unmanned/Autonomous Underwater Vehicles (UUVs or AUVs), a structure, etc.).
Figure 3E:
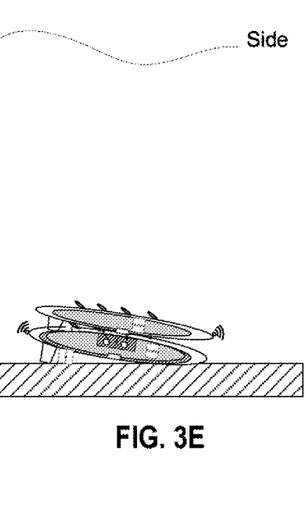
FIG. 3E illustrates a side view of the apparatus in a parked modus on the ocean floor.

FIG. 3A illustrates a side view of the apparatus' motion in self propelling modus with a surface expression. FIG. 3B illustrates a side view of the apparatus in self propelling modus operating below the sea surface. FIG. 3C illustrates a side view of the apparatus charging an AUV or interfacing with an independently deployed system. FIG. 3D illustrates a side view of the apparatus using a manipulator to collect and/or inspect an apparatus (e.g., Unmanned/Autonomous Underwater Vehicles (UUVs or AUVs), a structure, etc.). FIG. 3E illustrates a side view of the apparatus in a parked modus on the ocean floor.

Figure 4:
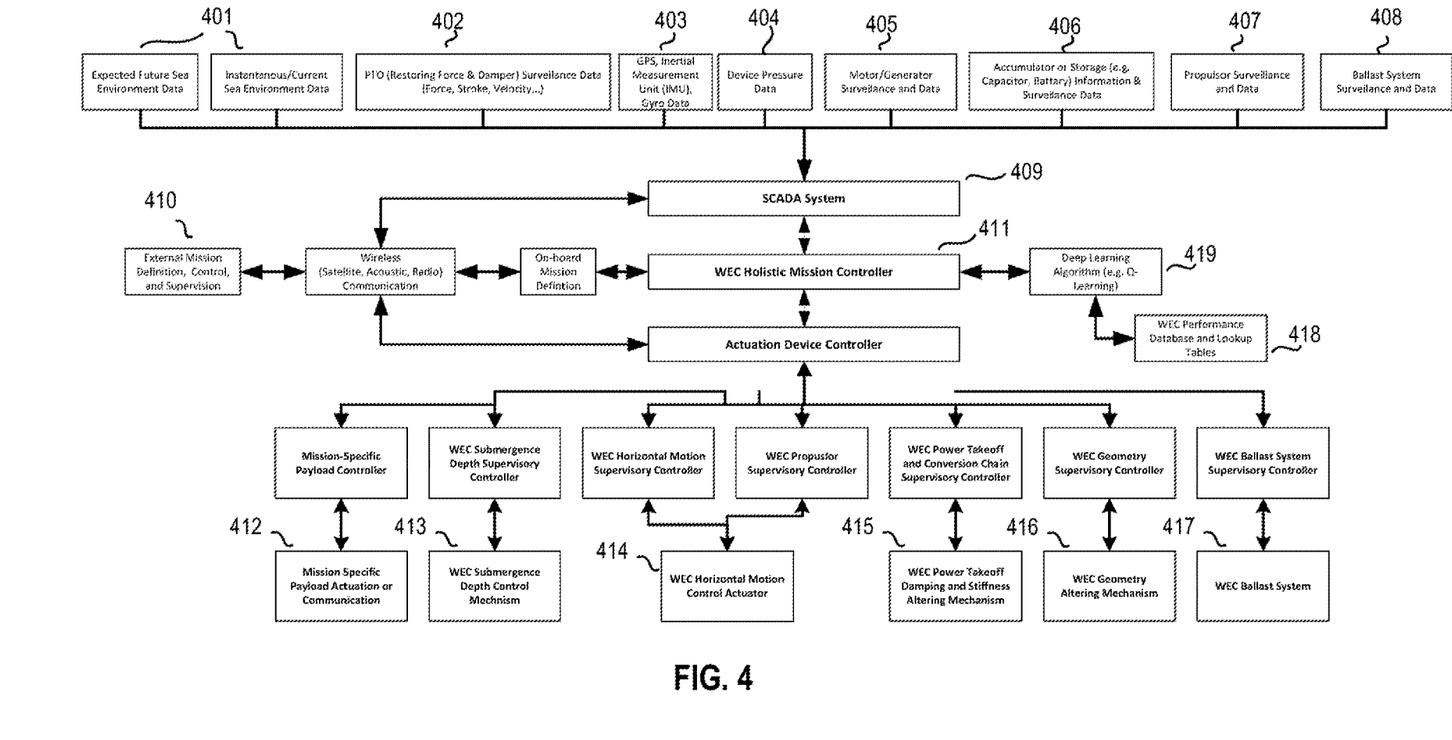
FIG. 4 is a block diagram of one embodiment of an interface controller for a wave energy converter apparatus including interaction between controller input and output sources, functionalities and data.

FIG. 4 illustrates one embodiment of a control system for a wave energy converter apparatus, such as the various embodiments of a wave energy converter apparatus disclosed herein. The control units and modules of FIG. 4 are described in more detail below.

The use of passively or actively controllable apertures 108 in absorber 101 and/or platform 104 enable the area 301 of the wave energy converter apparatus subject to wave excitation to be controlled to both avoid sudden, extreme spikes in structural loads as well as to optimize energy harvesting conditions. Given the complex interactions and changing requirements for ideal energy harvesting, the apparatus includes a mechanism for adjusting to changing wave conditions and to handle sudden, extreme load spikes. This mechanism helps manage the highly variable loading imposed on the apparatus at several time scales by changing sea states, superposition of waves, and the relative position of the apparatus.

Note there are a number of PTO subsystem variations that may be employed. These include those acting on (e.g., pulling on) a single mooring line for conversion of the linear relative motion between mooring lines, wire or belt and absorber buoy to electrical energy generator. Such generators often operate with short-term energy storage 303 such as, for example, flywheels, capacitors or batteries, to store energy generated as a result of conversion, as shown in FIG. 1A.

The maximum energy extraction potential for any wave energy converter is achieved when the primary absorbing body's natural frequency matches the frequency of the principle energy-carrying component of the sea state spectrum at a given moment. This frequency matching is known as resonance.

In one embodiment, the movements of the body of absorber 101 are preferably in resonance with the current wave conditions. The absorber resonance frequency is a function of 1) the absorber's mass, 2) the absorber's buoyancy, 3) the restoring force of the power takeoff unit(s) attached to the absorber, 4) the power extracting characteristics of the power takeoff acting on the absorber (damping), and 5) the absorber's hydrodynamic added mass and radiation damping. The added mass and radiation damping is itself a function of the absorber's depth and geometry, the latter component is dominated by the area normal to the absorber's motion.

Control of all these components may be coordinated to achieve maximum power extraction or load reduction on the absorber from incident waves. The system can include several redundant, independent mechanisms for matching the response characteristics of the apparatus to ocean wave conditions. For example, the same controllable apertures 108 described above for load management will also affect the hydrodynamic absorber properties, and thus the natural frequency of the absorber, by changing the shape of the absorber. Submergence depth can be used as a parameter to change the hydrodynamic absorber properties, and thus resonance frequency, of the apparatus, and is also considered in calculations to set other parameters for resonance control. The power takeoff units of the apparatus can also affect the absorber resonance frequency in all degrees of freedom through both the restoring force component ("spring") and energy extraction component ("damper").

The dominant wave energy frequency conditions change continuously with time and location and it is useful to tune the wave energy converter apparatus to achieve the optimum energy production from the system in a broad range of ocean conditions such as wave height, wave period and spectral shape. The system can be tuned, for example, by changing the operating depth, and/or hydrodynamic coefficients.

In one embodiment, the wave energy converter apparatus is controlled by a holistic device control architecture. In one embodiment, the control architecture comprises of supervisory control and data acquisition (SCADA) system 409 receiving information in the form of data from sensors onboard the device 402-408, as well as data and information collected from other sources and shared with the device 401. This information may comprise, but is not limited to, instantaneous, time history averaged, or predictions of wave period and height, water level, tide, and current environmental data 401, PTO forces, strokes, velocities 402, data from GPS and/or inertial measurement units (IMUs) 403, external pressure on the hull bodies 404, PTO motor/generator voltage, current, torque, speed and other data 406, accumulator, capacitor, battery or other kind of energy storage information 405, energy storage capacity and state of charge 406, status and operation of propulsors 407, and/or ballast system information 408.

In one embodiment the holistic control architecture receives and sends additional information and/or commands from external databases or user interfaces 410 or user defined input via satellite, radio frequency, acoustic frequency, optical communication, or other bidirectional communication lines.

In one embodiment the holistic controller uses a performance database or lookup table 418 of past control and response data when calculating commands for specific actuators as well as in planning how to achieve larger mission objectives.

In one embodiment, the past control and response data 418 is used in a deep learning algorithm 419 to continuously adapt the controls to accommodate changing external and on-board conditions.

In one embodiment of the holistic control architecture interfaces with a mission-specific payload controller, submergence depth supervisory controller, horizontal and vertical motion controllers, a PTO and electrical conversion chain supervisory controller, a WEC body geometry supervisory controller, and a ballast system supervisory controller; these controllers receive commands from the main holistic controller 411 and send commands to the physical mechanisms 412-417.

The supervisory controllers are capable of bidirectional communication with the physical mechanism through sensors, as well as bidirectional communication with each other and independently to external monitoring systems, In one embodiment of the holistic control architecture, machine learning algorithms might update the control commands which are sent through the holistic controller to the supervisory controllers for different subcomponents of the WEC.

The holistic control framework described herein enables control of hydrodynamic properties of the apparatus by control of one or many actuation methods, collected under the term HyTune 411. HyTune 411 comprises absorber structure and individual PTO load management by controlling embedded physical mechanism 412-417 to alter wave excitation (Froude-Krylov and diffraction) forces (e.g., exponential load decay with increasing apparatus depth for effective load mitigation), absorber radiation damping forces, and hydrodynamic added mass in such a way that optimal wave power absorption conditions are met while considering control limits imposed from the various component control subsystems.

In one embodiment of the holistic control framework described herein, the framework embraces control means to alter PTO characteristics such as damping behavior and restoring force coefficients to match the sea state for optimal power absorption in combination with hydrodynamic tuning means described above or to accompany hydrodynamic control means described above for load management (e.g., load mitigation in severe sea). For each energy producing operation sea station condition, the purpose of the holistic control approach is to control wave excitation on and hydrodynamic properties of the absorber in such a way that the device can extract energy out of the water waves and affect the desired body motions in the most efficient way while not exceeding structural or component design load limitations. This control approach and enables effective load management by means of relatively small operating depth adjustments and absorber geometry changes and includes but is not limited to highly responsive mitigation of extreme loads and peak stress during storm events.

For severe storm conditions or harsh wave climates, the holistic control framework can control the device to move deeper in the water column to the required safety operating depth using the depth altering mechanism 417, while independently and in parallel the system can adjust physically or virtually implemented PTO damping and restoring force coefficients to decrease loads on the absorber. Additionally, passive safety apertures or active safety apertures 108 can decrease excitation force if a specific local fluid pressure is reached or the actively controlled safety apertures 108 might be partially or fully opened. The holistic controller can orient the absorber position in such a way wave excitation loads are decreased.

Accordingly, the submerged pressure-differential design and the accompanying load management system allow for operation within specified limits to balance energy capture with the requirement to avoid damaging loads throughout the life of the apparatus.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

There is a number of example embodiments described herein.

Example 1 is an autonomous unmanned apparatus, comprising: an absorber having upper body and a platform; and at least one power take-off (PTO) unit coupled between the absorber and the platform and configured to displace movement of the absorber body relative to the platform, the at least one power take-off unit operable to perform motion energy conversion based on displacement of the absorber body in multiple degrees of freedom relative to the platform in response to wave excitation, wherein the at least one power take-off unit is operable to return the absorber body from a displaced position to a predefined equilibrium position and to provide a force acting on the absorber body for energy extraction.

Example 2 is the apparatus of example 1 that may optionally include a mooring system having a plurality of mooring lines coupled to one or both of the at least one PTO unit and the platform.

Example 3 is the apparatus of example 1 that may optionally include that each of the plurality of mooring lines are coupled to an anchor.

Example 4 is the apparatus of example 1 that may optionally include a ballast system incorporated into one or both of the absorber body and platform operable to increase or decrease the buoyancy of the absorber.

Example 5 is the apparatus of example 1 that may optionally include one or more thrusters incorporated into the absorber body and the platform operable to control one or both of horizontal and vertical motion of the system.

Example 6 is the apparatus of example 1 that may optionally include a steering system including one or more rudders or similar structures incorporated into one or both of the absorber body and the platform operable to control horizontal motion of the system.

Example 7 is the apparatus of example 1 that may optionally include that one or both of the absorber body and the platform having a flexible structure.

Example 8 is the apparatus of example 1 that may optionally include that a rigid structure with a mechanism, such as one or more apertures, for controlling a hydrodynamically active surface area of the absorber.

Example 9 is the apparatus of example 8 that may optionally include an aperture control mechanism operable to open or close each of the one or more apertures based on a control input.

Example 10 is the apparatus of example 8 that may optionally include that the aperture control mechanism comprises a passive control mechanism (not shown) to open or close at least one of the one or more apertures.

Example 11 is the apparatus of example 1 that may optionally include the at least one power take-off comprises a closed hydraulic system having a cylinder with a piston 302, as shown in FIG. 1C, wherein linear movement of the piston pressurizes hydraulic fluid to be discharged in a hydraulic motor (not shown) for coupling to an electric generator (not shown).

Example 12 is the apparatus of example 1 that may optionally include that the at least one power take-off comprises a gas-spring comprising a closed hydraulic system having a cylinder with a piston 302, as shown in FIG. 1C, wherein linear movement of the piston pressurizes fluid in hydraulic accumulators (not shown) for energy storage.

Example 13 is the apparatus of example 1 that may optionally include that the at least one power take-off is operable to convert linear mechanical motion into rotary motion or vice versa as a winch, a rack and pinion assembly, a mechanical ball screw, or a magnetic lead screw assembly.

Example 14 is the apparatus of example 1 that may optionally include that the at least one power take-off is operable as one selected from a group consisting of: one or multiple rotary electrical machines, driven directly or via a gearbox; a linear generator assembly; a mechanical spring; a mechanical clutch; and a mechanical brake.

Example 15 is the apparatus of example 1 that may optionally include an energy storage to store energy in intermediate stages for use in one or both of active motion control of the apparatus and to maintain power flow from the apparatus.

Example 16 is the apparatus of example 1 that may optionally include that horizontal and/or vertical motion of the apparatus is controlled.

Example 17 is the apparatus of example 16 that may optionally include that the horizontal and/or lateral motion is controlled using the one or more PTO unit to control the length of the one or more tethers connecting the absorber body to the platform.

Example 18 is the apparatus of example 16 that may optionally include that the horizontal and/or lateral motion is controlled using the one or more PTO unit to control the tension of the one or more tethers connecting the absorber body to the platform.

Example 19 is the apparatus of example 16 that may optionally include that the horizontal and/or lateral motion is controlled by adjusting the geometry area of one or both of the absorber and the platform interacting with the incident wave action.

Example 20 is the apparatus of example 1 that may optionally include that one or both of the absorber and the platform submergence depth around which the absorber body oscillates in reference to a still water line based on a control input.

Example 21 is the apparatus of example 20 that may optionally include that the depth adjustment mechanism comprises one or more PTO units.

Example 22 is the apparatus of example 20 that may optionally include that the depth adjustment mechanism further comprises of the one or more PTO unit interacting with one or more of one or more mooring lines and an anchor.

Example 23 is the apparatus of example 20 that may optionally include that the depth adjustment mechanism comprises of a ballast system in one or both of the absorber body and the platform.

Example 24 is the apparatus of example 20 that may optionally include that the depth adjustment mechanism comprises of one or more thrusters in one or both of the absorber and the platform.

Example 25 is the apparatus of example 1 that may optionally include one or more mechanisms to interact with a payload, including using generated electrical power to charge a battery back.

Example 26 is the apparatus of example 25 that may optionally include that the connection to the payload is via an external structure (not shown) of the platform.

Example 27 is the apparatus of example 25 that may optionally include that the connection to the payload is via one or both of a cable and a rigid connection arm (not shown).

Example 28 is the apparatus of example 25 that may optionally include that the connection to the payload comprises one or more docking ports for one or both of communication and power charging (not shown).

Example 29 is the apparatus of example 1 that may optionally include that the platform contains a storage bay with doors (not shown) that can be opened or closed to the surrounding body of water.

Example 30 is the apparatus of example 29 that may optionally include that the storage bay is capable of carrying a payload such as mechanisms of remote inspection, battery packs, sensor packs, or other equipment to be temporarily or permanently deployed and/or recovered or dropped off.

Example 31 is the apparatus of example 1 that may optionally include a wireless communication device comprising of one or more antennas 304, as shown in FIG. 1A.

Example 32 is the apparatus of example 31 that may optionally include that the wireless communication apparatus is further configured to transmit data generated based on one or more sensor input inclusive of parameters pertaining to the wave energy converter apparatus and/or external environment.

Example 33 is the apparatus of example 31 that may optionally include that the wireless communication apparatus is further configured to transmit data generated based on one or more sensor input inclusive of parameters pertaining to a payload.

Example 34 is the apparatus of example 1 that may optionally include one or more sensors, including but not limited to: 1) environmental measuring sensors to detect pressure; 2) one or more sonar, radar, acoustic and LIDAR sensors; 3) one or more visual sensors. In one embodiment, the environmental measurement sensors detect pressure to, for example, measure wave heights for an earthquake/tsunami warning systems. In one embodiment, the sonar, radar and laser sensors measure objects or surfaces in the surrounding body of water. In one embodiment, the one or more visual sensors measure surrounding structures, surfaces to, for example, complete an inspection of steel structure or docking AUV.

Other examples of any preceding embodiment, further comprises: an adaptable payload compartment which can accommodate, power, and communicate with sensors and actuators used for specific missions, including docking and charging stations of other marine vehicles, marine sensor systems (multibeam echosounders, side-scan sonar, acoustic doppler current profilers, conductivity-temperature-depth sensors), or other oceanographic equipment.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely, such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

In the claims, reference to an element in the singular is not intended to mean "one and only one" unless explicitly so stated, but rather "one or more." All structural, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

In addition to any other claims, the applicant(s)/inventor(s) claim each and every embodiment of the technology described herein, as well as any aspect, component, or element of any embodiment described herein, and any combination of aspects, components or elements of any embodiment described herein.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. An autonomous unmanned apparatus, comprising:
   an absorber body;
   a platform coupled to the absorber body; and
   at least one power take-off (PTO) unit coupled to the platform, wherein the absorber body is displaced in multiple degrees of freedom relative to the platform to a displaced position in response to a wave excitation, wherein the absorber body converts the wave excitation into a motion energy associated with the displacement of the absorber body; and wherein the at least one power take-off unit uses one or more tethers to return the absorber body from the displaced position to a predefined equilibrium position and to provide a force acting on the absorber body for extraction of the motion energy; and
   one or more thrusters that are incorporated into at least one of the absorber body and the platform to control one or both of a horizontal and a vertical motion of the at least one of the absorber body and the platform.

2. The autonomous unmanned apparatus of claim 1, wherein the at least one PTO unit comprises a cylinder with a piston to discharge, a hydraulic fluid.

3. The autonomous unmanned apparatus of claim 1, wherein the at least one PTO unit comprises a cylinder with a piston to pressure fluid for energy storage.

4. The autonomous unmanned apparatus of claim 1, wherein the at least one PTO unit is operable to convert linear mechanical motion into rotary motion or vice versa.

5. The autonomous unmanned apparatus of claim 1, wherein the at least one PTO Unit operates as one selected from a group consisting of: a rotary electrical machine; a linear generator assembly; a mechanical spring; a mechanical clutch; and a mechanical brake.

6. The autonomous unmanned apparatus of claim 1, further comprising:
   an energy storage coupled to the platform to store energy.

7. The autonomous unmanned apparatus of claim 1 wherein the one or both of the horizontal and lateral motion is controlled using the at least one PTO unit to control the length of the one or more tethers connecting the absorber body to the platform.

8. The autonomous unmanned apparatus of claim 1 wherein one or both of the horizontal and lateral motion is controlled using the at least one PTO unit to control the tension of the one or more tethers connecting the absorber body to the platform.

9. The autonomous unmanned, apparatus of claim 1 wherein one or both of the horizontal and lateral motion is controlled by adjusting the area of one or both of the absorber and the platform interacting with the wave excitation.

10. The autonomous unmanned apparatus of claim 1 wherein one or both of the absorber and the platform submergence depth around which the absorber body oscillates in reference to a still water line is determine based on an input from a controller.

11. The autonomous unmanned apparatus of claim 10 wherein the depth adjustment mechanism comprises the at least one PTO unit.

12. The autonomous unmanned apparatus of claim 10 wherein the depth adjustment mechanism further comprises the at least one PTO unit interacting with one or more of one or more mooring lines and an anchor.

13. The autonomous unmanned apparatus of claim 10 wherein the depth adjustment mechanism comprises of a ballast system in one or both of the absorber body and the platform.

14. The autonomous unmanned apparatus of claim 10 wherein the depth adjustment mechanism comprises of one or more thrusters in one or both of the absorber and the platform.

15. The autonomous unmanned apparatus of claim 1 further comprising a connector to connect with a payload to charge a battery.

16. The autonomous unmanned apparatus of claim 15 wherein the connection to the payload is is bidirectional.

17. The autonomous unmanned apparatus of claim 15 wherein the connection to the payload is via a cable.

18. The autonomous unmanned apparatus of claim 15 wherein the connection to the payload is for one or both of communication and power charging.

19. An autonomous unmanned apparatus, comprising:
   an absorber body;
   a platform coupled to the absorber body;
   at least one power take-off (PTO) unit coupled to the platform, wherein the absorber body is displaced in a multiple degrees of freedom relative to the platform to a displaced position in response to a wave excitation, wherein the absorber body converts the wave excitation into a motion energy associated with the displacement of the absorber body; and wherein the at least one power take-off unit uses one or more tethers to return the absorber body from the displaced position to a predefined equilibrium position and to provide a force acting on the absorber body for extraction of the motion energy; and
   further comprising a ballast system incorporated into of the absorber body to increase or decrease the buoyancy of the absorber.

20. The autonomous unmanned apparatus of claim 19, further comprising a mooring system having one or more mooring lines coupled to the platform.

21. The autonomous unmanned apparatus of claim 20, wherein each of the plurality of mooring lines is coupled to an anchor.

22. An autonomous unmanned apparatus, comprising:
   an absorber body;
   a platform coupled to the absorber body;
   at least one power take-off (PTO) unit coupled to the platform, wherein the absorber body is displaced in a multiple degrees of freedom relative to the platform to a displaced position in response to a wave excitation, wherein the absorber body converts the wave excitation into a motion energy associated with the displacement of the absorber body; and wherein the at least one power take-off unit uses one or more tethers to return the absorber body from the displaced position to a predefined equilibrium position and to provide a force acting on the absorber body for extraction of the motion energy, wherein at least one of the absorber body and the platform is flexible.

23. An autonomous unmanned apparatus, comprising:
   an absorber body;
   a platform coupled to the absorber body;
   at least one power take-off (PTO) unit coupled to the platform, wherein the absorber body is displaced in a multiple degrees of freedom relative to the platform to a displaced position in response to a wave excitation, wherein the absorber body converts the wave excitation into a motion energy associated with the displacement of the absorber body; and wherein the at least one power take-off unit uses one or more tethers to return the absorber body from the displaced position to a predefined equilibrium position and to provide a force acting on the absorber body for extraction of the motion energy; and a rigid structure with one or more apertures to change a hydrodynamically active surface area of the absorber.

24. The autonomous unmanned apparatus of claim 23 wherein each of the one or more apertures is configured to open or close based on an input from a controller.

25. The autonomous unmanned apparatus of claim 23 wherein the at least one of the one or more apertures opens or closes to decrease a force of the wave excitation.

26. An autonomous unmanned apparatus, comprising:
an absorber body;
a platform coupled to the absorber body;
at least one power take-off (PTO) unit coupled to the platform, wherein the absorber body is displaced in a multiple degrees of freedom relative to the platform to a displaced position in response to a wave excitation, wherein the absorber body converts the wave excitation into a motion energy associated with the displacement of the absorber body; and wherein the at least one power take-off unit uses one or more tethers to return the absorber body from the displaced position to a predefined equilibrium position and to provide a force acting on the absorber body for extraction of the motion energy wherein the platform contains a storage bay that can be opened or closed to the surrounding body of water.

27. The autonomous unmanned apparatus of claim 26 wherein the storage bay is capable of carrying a payload including one or more of mechanisms of remote inspection, batteries, or sensors, to be deployed and/or recovered.

28. An autonomous unmanned apparatus, comprising:
an absorber body;
a platform coupled to the absorber body;
at least one power take-off (PTO) unit coupled to the platform, wherein the absorber body is displaced in a multiple degrees of freedom relative to the platform to a displaced position in response to a wave excitation, wherein the absorber body converts the wave excitation into a motion energy associated with the displacement of the absorber body; and wherein the at least one power take-off unit uses one or more tethers to return the absorber body from the displaced position to a predefined equilibrium position and to provide a force acting on the absorber body for extraction of the motion energy; and a wireless communication device comprising one or more antennas.

29. The autonomous unmanned apparatus of claim 28 wherein the wireless communication device is configured to transmit data generated based on one or more sensor inputs including parameters pertaining to the autonomous unmanned apparatus and/or external environment.

30. The autonomous unmanned apparatus of claim 28 wherein the wireless communication device is configured to transmit data generated based on one or more sensor inputs including parameters pertaining to a payload.

31. An autonomous unmanned apparatus, comprising:
an absorber body;
a platform coupled to the absorber body;
at least one power take-off (PTO) unit coupled to the platform, wherein the absorber body is displaced in a multiple degrees of freedom relative to the platform to a displaced position in response to a wave excitation, wherein the absorber body converts the wave excitation into a motion energy associated with the displacement of the absorber body; and wherein the at least one power take-off unit uses one or more tethers to return the absorber body from the displaced position to a predefined equilibrium position and to provide a force acting on the absorber body for extraction of the motion energy; and one or more sensors, including one or more environmental measuring sensors to detect pressure; one or more sonar, radar, acoustic and LIDAR sensors; one or more visual sensors, or any combination thereof.

32. An autonomous unmanned apparatus, comprising:
an absorber body;
a platform coupled to the absorber body;
at least one power take-off (PTO) unit coupled to the platform, wherein the absorber body is displaced in a multiple degrees of freedom relative to the platform to a displaced position in response to a wave excitation, wherein the absorber body converts the wave excitation into a motion energy associated with the displacement of the absorber body; and wherein the at least one power take-off unit uses one or more tethers to return the absorber body from the displaced position to a predefined equilibrium position and to provide a force acting on the absorber body for extraction of the motion energy; and
a steering system including one or more rudders incorporated into one or both of the absorber body and the platform operable to control a horizontal motion of the at least one of the absorber body and the platform.

* * * * *